(12) United States Patent
Haissig et al.

(10) Patent No.: US 11,746,826 B2
(45) Date of Patent: Sep. 5, 2023

(54) ROLLER FOR ROLLER BEARING, ASSEMBLY INCLUDING A GRINDING TOOL AND A ROLLER FOR A ROLLER BEARING, AND METHOD FOR MANUFACTURING A ROLLER FOR A ROLLER BEARING

(71) Applicant: AKTIEBOLAGET SKF, Gothenburg (SE)

(72) Inventors: Mathias Haissig, Wiesentheid (DE); Helmut Haupt, Kolitzheim (DE); Johannes Ullmann, Wonfurt (DE); Markus Volkmuth, Werneck-Zeuzleben (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/411,604

(22) Filed: Aug. 25, 2021

(65) Prior Publication Data

US 2022/0065295 A1 Mar. 3, 2022

(30) Foreign Application Priority Data

Sep. 2, 2020 (DE) .......................... 102020211036.0

(51) Int. Cl.
*F16C 33/36* (2006.01)
*B24B 5/37* (2006.01)

(52) U.S. Cl.
CPC .............. *F16C 33/366* (2013.01); *B24B 5/37* (2013.01)

(58) Field of Classification Search
CPC ........ F16C 33/34; F16C 33/36; F16C 33/366; B24B 5/37; B24B 7/16; B24B 19/06

USPC .................................................... 29/898.068
See application file for complete search history.

(56) References Cited

U.S. PATENT DOCUMENTS

| | | | | |
|---|---|---|---|---|
| 6,767,134 B2 * | 7/2004 | Murai | .................... | F16C 23/088 384/568 |
| 6,997,617 B2 * | 2/2006 | Ide | ........................ | F16C 19/225 384/450 |
| 7,097,678 B2 * | 8/2006 | Ohtsubo | .................. | C09K 3/14 51/293 |

(Continued)

FOREIGN PATENT DOCUMENTS

| | | |
|---|---|---|
| DE | 505357 C | 8/1930 |
| DE | 10230357 A1 | 3/2003 |

(Continued)

OTHER PUBLICATIONS

Communication from the European Patent Office dated Jan. 18, 2022, in related application No. EP 21 19 3248, including Search Report and Written Opinion, and translation thereof.

(Continued)

*Primary Examiner* — James Pilkington
(74) *Attorney, Agent, or Firm* — J-TEK LAW PLLC; Scott T. Wakeman; Mark A. Ussai

(57) ABSTRACT

A roller for a roller bearing has a first end surface and a second end surface and a rolling surface between the first and second end surfaces. The first end surface has an at least partially ground profile having a non-constant curvature such as a logarithmic profile. Also, an assembly including a grinding tool and a roller with an end surface having a ground non-constant curvature.

12 Claims, 3 Drawing Sheets

(56) References Cited

U.S. PATENT DOCUMENTS

| | | | |
|---|---|---|---|
| 7,416,346 B2* | 8/2008 | Takemura | F16C 33/585 |
| | | | 384/450 |
| 8,033,737 B2* | 10/2011 | De Mul | F16C 33/366 |
| | | | 384/450 |
| 9,174,316 B2* | 11/2015 | Higashi | B23P 13/02 |
| 2003/0012477 A1 | 1/2003 | Murai et al. | |
| 2003/0236058 A1 | 12/2003 | Kamamura et al. | |
| 2009/0003747 A1 | 1/2009 | Mul | |
| 2014/0126850 A1* | 5/2014 | Liang | F16C 19/364 |
| | | | 29/898.068 |
| 2015/0300410 A1 | 10/2015 | Murata et al. | |
| 2016/0368112 A1 | 12/2016 | Bartholomeau et al. | |

FOREIGN PATENT DOCUMENTS

| | | |
|---|---|---|
| DE | 102005061102 A1 | 7/2007 |
| DE | 102008028164 A1 | 1/2010 |
| DE | 102015105511 A1 | 10/2015 |
| JP | 2018165552 A | 10/2018 |
| WO | WO2018/200324 * | 11/2018 |

OTHER PUBLICATIONS

Office Action from the German Patent Office dispatched May 4, 2021 in related German application No. 10 2020 211 036.0, and translation thereof.

* cited by examiner

ROLLER FOR ROLLER BEARING, ASSEMBLY INCLUDING A GRINDING TOOL AND A ROLLER FOR A ROLLER BEARING, AND METHOD FOR MANUFACTURING A ROLLER FOR A ROLLER BEARING

CROSS-REFERENCE

This application claims priority to German patent application no. 10 2020 211 036.0 filed on Sep. 2, 2020, the contents of which are fully incorporated herein by reference.

TECHNOLOGICAL FIELD

The present invention relates to a roller for a roller bearing and to an assembly including a grinding tool and a roller for a roller bearing, and to a method for manufacturing a roller for a roller bearing.

BACKGROUND

Rollers for roller bearings usually have a straight profile on their respective end sides, i.e., the end sides are neither curved inward nor outward. However, in certain applications it can occur that a straight end-side profile leads to high friction and thus to high temperatures. In addition, with straight-ground end sides, i.e., end sides that extend perpendicular to the roller axis, an unfavorable roller-flange contact can arise, which under axial load can lead to increased friction, wear, or bearing damage. Furthermore, rollers are known that have a ground end-side profile with a constant, spherical curvature, which, however, have the disadvantage that they must be manufactured very precisely in order to prevent critical operating states, such as, for example, excessive edge loading or contact-ellipse truncations.

SUMMARY

It is therefore an aspect of the present disclosure to provide a roller having an improved end-side profile and an improved axial load capacity.

In the following a roller for rolling bearings is described, which roller has two end surfaces and a rolling surface. In order to have lower friction with an axial load, at least one end surface has an at least partially ground profile having a non-constant curvature. A roller bearing equipped with such a roller can in particular have a higher axial load bearing capacity and, for example, be used as a wheelset bearing, transmission bearing, traction motor bearing of rail vehicles, wind turbine bearing, rolling mill bearing.

A "non-constant curvature" is understood to mean a curvature of a curve whose radius of curvature is not constant along the course of the curve, but rather changes. For example, the curvature of the curve that corresponds to the ground profile of the end surface, and extends from a starting point to an end point, can be stronger or weaker with increasing distance from the starting point.

According to a further exemplary embodiment, the curvature is determined along a curve extending in the radial direction. The curvature is preferably a logarithmic curvature and/or the profile is a torus-shaped profile. An end surface profile having a logarithmic curvature and/or a torus-shaped profile makes it possible to avoid excessive edge loading and to reduce friction in the end-side contact of roller bearings.

The roller can in particular be a tapered roller that is correspondingly used in a tapered roller bearing. The end surface having the at least partially ground profile preferably slips against a guide flange of the roller bearing. In the case of a tapered roller that has a first end surface having a larger diameter and a second end surface having a smaller diameter, the end surface having the larger diameter forms a guide-flange slip surface, and the end surface having the smaller diameter forms a retaining-flange slip surface. As mentioned above, at least the guide flange slip surface is at least partially ground and has a non-constant curvature. The retaining-flange slip surface can have a flat, a constantly curved, or a non-constantly curved profile and, for example, be ground, hard turned, or manufactured by another manufacturing mechanism.

Here in comparison to other processing methods, such as, for example, hard turning or eroding, grinding makes it possible to form the profile having the non-constant curvature in shorter processing times, and thus to make possible a more efficient manufacturing of the end-surface profile. Furthermore, by grinding it is also possible to provide smaller rolling elements with a profile having a non-constant curvature. Furthermore, the term "ground profile" is understood to mean a profile that is formed by grinding and whose shape is essentially determined by the grinding. In other words, a "ground profile" is in particular not understood to be a profile that is formed by another manufacturing method, for example, by hard turning, and subsequently a surface finishing, such as, for example, barrel finishing, is undergone by elimination of irregularities.

The ground profile is preferably formed on the transition from the end surface to a rolling surface of the roller. In particular, the at least partially ground profile of the end side can merge via a preferably unground edge reduction into a profile that is formed on the rolling surface of the roller. Friction at the transition from the end surface to a rolling surface of the roller against the flange can thereby be reduced, whereby the temperature generated by the friction is reduced, and the service life of the roller and thus of the roller bearing can be increased. Furthermore, it is advantageous when the rolling surface of the roller is also ground. Starting from the edge reduction, the profile that is formed on the rolling surface of the roller preferably has a non-constant curvature. The curvature is most preferably a logarithmic curvature, and/or the profile is a torus-shaped profile.

According to one preferred exemplary embodiment, the profile at $0.9 \times R$ has a pitch $\beta$, which falls between $0.15°$ and $2°$ ($0.15° \leq \beta \leq 2.0°$), wherein R is the roller radius. A tangential abutment of the roller against a flange of a rolling-element bearing can thereby advantageously be achieved, and in particular an excessive edge loading of the roller can be prevented.

With $0.88 \times R$, a profile height Y preferably falls between $0.00007 \times R$ and $0.0020 \times R$ ($0.00007 \times R \leq Y \leq 0.0020 \times R$). At a radial distance X, a maximum profile height Z can preferably fall between $0.0002 \times R$ and $0.0065 \times R$ ($0.0002 \times R \leq Z \leq 0.0065 \times R$). Here the term "profile height" is understood to mean a distance from the profile to a reference value toward the roller axis or axis of rotation. With the roller described above, the reference value falls at $0.65 \times R$. The edge-reduction region preferably begins with a value X that falls between $0.8900 \times R$ and $0.9680 \times R$ ($0.8900 \times R \leq X \leq 0.9680 \times R$), and ends with a value C that falls between $0.9940 \times R$ and $0.9994 \times R$ ($0.9940 \times R \leq C \leq 0.9994 \times R$), wherein a raceway profile is preferably formed following the edge reduction.

According to a further exemplary embodiment, the roller has at least one unground surface region radially inside the ground surface. The unground surface region can be configured, for example, as a depression, a so-called dimple, in the region of the ground surface. This depression or the dimple can serve, for example, to retain the rollers captively or in a cage during installation. Alternatively or additionally, the non-ground surface region can also be provided radially outside the ground surface, for example, at the transition to the raceway or at an edge.

According to a further aspect, an assembly, including a grinding tool and a roller described above, is provided for a roller bearing, wherein the grinding tool and the roller are rotatable/movable relative to each other. Here the grinding tool is configured such that it forms the ground profile, and/or the grinding tool and the roller are movable with respect to each other such that the ground profile can be formed. For example, the grinding tool and the roller can be tiltable with respect to each other in order to form the ground profile. Alternatively or additionally, the grinding tool can have a profile complementary to the profile to be formed on the roller.

According to a further preferred exemplary embodiment, the grinding tool and the roller are disposed with respect to each other such that they interact essentially along a line-shaped contact region. Here the contact region essentially corresponds to the grinding region and forms, roughly speaking, a line, along which the roller and the grinding tool contact. However, in general the contact region has a certain area, wherein the smaller the area of the contact region the more precise is the configuration of the ground profile. For example, a flat profile can be obtained by a radially extending curve that determines the non-constant curvature being rotated about the axis of rotation. Due to the rotating of the radially extending curve about the axis of rotation, a flat profile is obtained that has the non-constant curvature in the radial direction.

According to a further exemplary embodiment, the grinding tool rotates along an axis of rotation, and/or the roller rotates along an axis of rotation, wherein in particular the rotational directions of the axes of rotation are chosen such that a counter-movement is carried out in the contact region. The grinding efficiency can thereby be improved, for example.

Furthermore, the axis of rotation of the grinding tool and the axis of rotation of the roller can enclose an angle that assumes a value between 0° and 90°, in particular between 25° and 75°. Here the angle between the axis of rotation of the grinding tool and the axis of rotation of the roller can be adjusted depending on the roller to be ground.

According to a further exemplary embodiment, in cross-section the grinding tool has the shape of a truncated cone, and furthermore includes a grinding surface that is formed on the outer surface of the truncated cone, wherein in particular the outer surface has the complementary profile. In this way the profile to be ground can easily be formed on the roller.

The grinding surface on the truncated cone preferably has a first larger and a second smaller diameter, and the grinding tool is disposed on the roller such that the first larger diameter of the grinding surface contacts the roller radially further inward, i.e., at a smaller roller diameter, and the second smaller diameter of the grinding surface contacts the roller radially further outward, i.e., at a larger roller diameter. With a counter-rotation of the roller and of the grinding tool it can thereby be made possible that the rotational speeds of the smaller roller diameter and of the larger grinding tool diameter, or of the larger roller diameter and of the smaller grinding tool diameter, match, so that a difference in the relative speeds, in particular in the region of the contact region, is smaller.

According to a further embodiment, the grinding surface includes a coating made of a nickel matrix including embedded grinding particles, in particular cubic boron nitride (also called CBN), and/or diamond, wherein a grain size of the grinding particles falls in the range between 20 and 100 μm. The grain size can preferably be 50±20 μm, even more preferably 46±2 μm. Furthermore, the grinding tool can include a base body on which the coating is formed. In particular, the base body can be formed from metal, for example, steel. The base body is preferably very stiff, and preferably has a Young's modulus of more than 100 GPa.

CBN, or cubic boron nitride, is the second-hardest material known after diamond. While diamond is comprised of pure carbon that is disposed in a tight three-dimensional matrix, CBN has the same three-dimensional matrix, which, however, is comprised of boron and nitrogen atoms. Due to the complex atomic structure, a greater number of grain shapes is possible with CBN than, for example, with diamond. The possible grain shapes can extend from an octahedron up to a cube shape, or even from an octahedron up to a tetrahedron. Furthermore, CBN has a high thermal conductivity and a low friction coefficient, and a specific weight of 3.48 g/cm$^3$.

The increasing use of more wear-resistant and thus difficult-to-machine steel alloys, and the simultaneously required performance increases and quality requirements, led machine-side and grinding-wheel-side to further developments. In the material to be processed, as soon as the alloy additions are converted into a carbide form, as is the case with powder metallurgy steels, conventional abrasives such as corundum ($Al_2O_3$) quickly reach their performance limit (Knoop hardness of 2,200), and the use of CBN, having a Knoop hardness of 4,500, is more than justified. In addition, CBN has advantages compared to $Al_2O_3$ with respect to heat conductivity, and thus has a cooler grinding.

Depending on the material to be ground, CBN also has the advantage that in contrast to diamond, it includes no carbon that diffuses into the material to be ground, in particular the steel alloys, and can thereby change it in its material properties. CBN has a long service life and excellent material removal rates, and is mainly used in domains that usually have short grinding cycle times and fully automated manufacturing. In particular, powder-metallurgical or high-alloy tool steels are in addition often no longer grindable economically using conventional abrasives.

According to a further embodiment, the embedded grinding particles are crushed. In grinding technology, "crushing" (Engl. "breaking") is understood to mean the breaking of grain tips in order to increase the dimensional accuracy and the grinding performance. This is effected using a hard-metal roller which, rotating and in a path-controlled manner, traverses the grinding surface also rotating with the same circumferential speed, and breaks protruding grain tips, deviating from the profile line, to a precise dimension. In this process a relative speed between the two circumferential speeds of the hard-metal roller and the grinding surface should be as low as possible. Crushed grinding particles make possible in particular the grinding of highly precise profiles and surface qualities. Alternatively the embedded grinding particles can also be non-crushed.

According to a further aspect of the invention, a method is provided for manufacturing a roller for a roller bearing, as described above, wherein in particular an assembly described above is used.

In particular, the method can include the following steps:
a. providing a roller for a roller bearing, including two end surfaces and a rolling surface, wherein the roller has a defined measurement of its dimensions, and
b. grinding at least one end surface of the roller using a grinding tool so that the at least one end surface has an at least partially ground profile having a non-constant curvature.

In particular, the roller can have the dimension of its roller length. A "roller length" is understood to mean the length of the roller between the two end surfaces along the axis of rotation. The dimension is, for example, one to four times the height of the desired profile. Here the height of the profile corresponds to the axial extension along the ground profile in the axial direction of the roller. Here the dimension in the region of the axis of rotation can be smaller than at the transition to the rolling surface. For example, the dimension can be 30 μm in the center and 50 μm at the transition to the rolling surface.

Here the roller provided can already have a base shape of the desired rollers. For example, the roller can have a conical shape, a cylindrical shape, or the like. The base shape can be formed from blanks by casting and/or mechanical processing.

The roller provided is preferably already hardened, including the two end sides and/or the rolling surface. Furthermore, the roller provided can be pre-ground and/or hard turned prior to the grinding of the end-side profile. This can be advantageous in order to provide a flat surface. For example, during the subsequent grinding of the end-surface profile, the dimension provided can be partially and/or completely ground away in order to obtain the end-side profile.

The end surfaces are preferably ground before the rolling surfaces. For example, a pre-ground roller can first be provided with the desired end-surface profiles, and following the profiling grinding process a final processing method can be effected for surface finishing, for example, a polishing, a honing, a lapping, and/or a surface finishing, as well as a grinding of the rolling surface.

According to a further embodiment, the method comprises a turning of a depression or of the dimple in the region of an axis of rotation of the roller, wherein the depression has a defined diameter. The depression can preferably be formed prior to the grinding of the end surfaces. For example, the defined diameter of the depression can be dependent on a roller diameter. The diameter of the depression is preferably smaller than 0.65 times the roller diameter. This makes possible a flexible retaining of the roller against the cage during installation.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
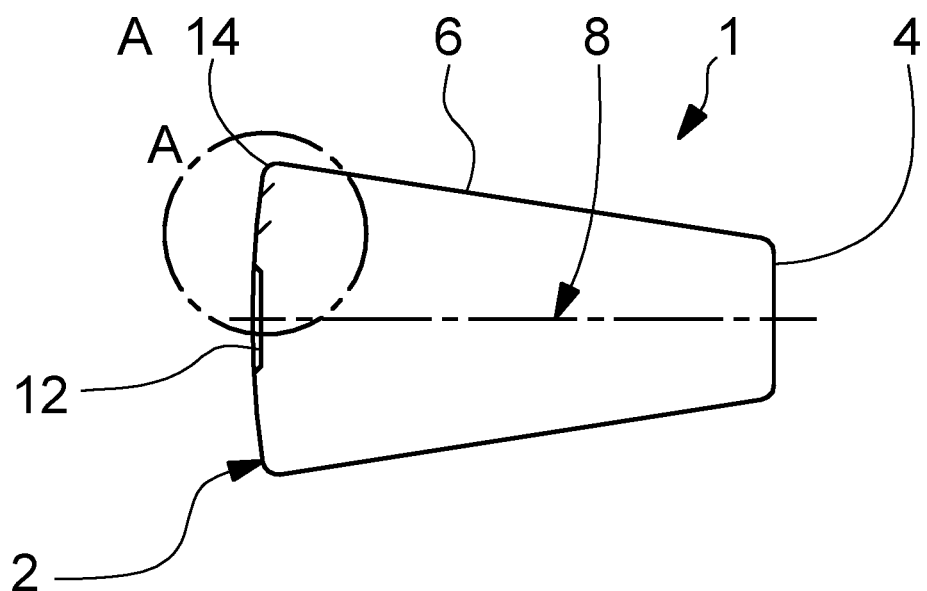
FIG. 1 is a roller for a roller bearing according to an embodiment of the present disclosure.
Figure 2:
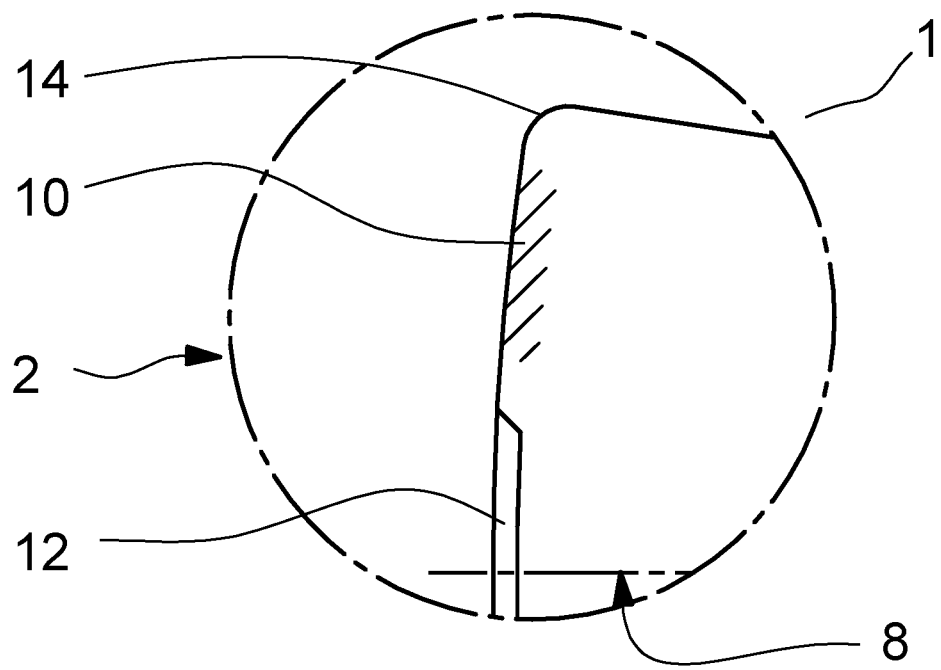
FIG. 2 is a detail view of region A of FIG. 1.

FIG. 1 shows a roller 1 for a roller bearing that is configured in the depicted exemplary embodiment as a tapered roller that is used in a tapered roller bearing. FIG. 2 shows a section A of a profile of the roller 1 on one of its end surfaces 2. Alternatively the roller can also have another shape, for example, a cylindrical shape. The roller 1 is provided with two end surfaces 2, 4 and a rolling surface 6, wherein the roller 1 is configured to rotate about an axis of rotation 8. Here in the case of the tapered roller shown, the end surface 4 has a smaller diameter, and the end surface 2 has a larger diameter, wherein in particular the end surface 4 slips against a guide flange (not shown) of the bearing, and the end surface 2 can contact a retaining flange (not shown).

In order to have lower friction with an axial load, and thereby prevent excessive edge loading, the end surface 2 has an at least partially ground profile 10. In FIG. 2, the ground profile 10 is depicted by a hatched surface. The profile 10 has a non-constant curvature, wherein the curvature is determined along a curve extending in the radial direction, and, for example, is a logarithmic curvature. Alternatively or additionally, the ground profile 10 can have a torus-shaped form. The ground profile can be formed, for example, up to a transition region 14 from the end surface 2 to the rolling surface 6 of the roller 1. In particular, the transition region 14 can be configured as a preferably unground edge reduction that merges into a profile formed on the rolling surface 6 of the roller 1. Furthermore, starting from the edge reduction, the profile that is formed on the rolling surface 6 of the roller 1 can also have a non-constant curvature. For example, the profile of the rolling surface 6 of the roller 1 can have a logarithmic curvature and/or be configured as a torus-shaped profile.

Figure 5:
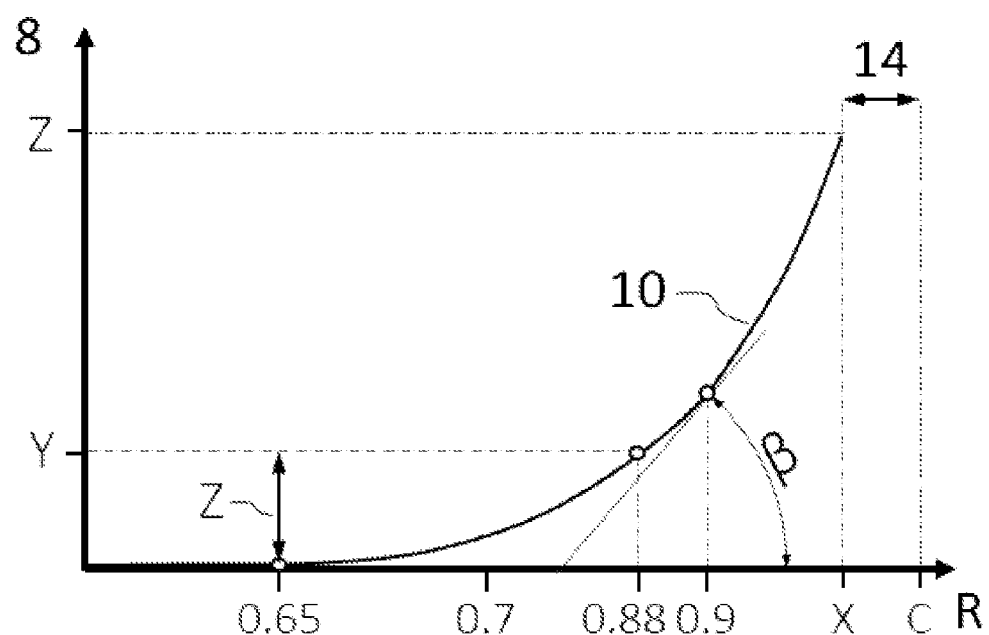
FIG. 5 is a graph schematic that shows a depiction of the ground profile of the roller from FIG. 1.

FIG. 5 is a schematic graph that shows a depiction of the ground profile, wherein the roller radius R is plotted on the X axis, and the axis of rotation is plotted on the Y axis. At a distance of $0.9 \times R$, the ground profile 10 having the non-constant curvature has a pitch $\beta$, which falls between $0.15°$ and $2°$ ($0.15° \leq \beta \ 2.0°$), wherein R is the roller radius or half the roller diameter. A tangential abutment of the roller 1 against a flange of a rolling-element bearing can thereby advantageously be achieved, and in particular an excessive edge loading of the roller 1 can be prevented.

Furthermore, with $0.88 \times R$, with the profile 10 a profile height Y preferably falls between $0.00007 \times R$ and $0.0020 \times R$ ($0.00007 \times R \leq Y \leq 0.0020 \times R$). The profile height is a distance from the profile to a reference value toward the axis of rotation 8 of the roller 1, wherein with the roller described above, the reference value falls at $0.65 \times R$. With a radial distance X, the maximum profile height Z falls between $0.0002 \times R$ and $0.0065 \times R$ ($0.0002 \times R \leq Z \leq 0.0065 \times R$).

Furthermore, the transition region 14 or edge-reduction region of the roller 1 begins with a value X that falls between $0.8900 \times R$ and $0.9680 \times R$ ($0.8900 \times R \leq X \leq 0.9680 \times R$), and ends with a value C that falls between $0.9940 \times R$ and $0.9994 \times R$ ($0.9940 \times R \leq C \leq 0.9994 \times R$).

Furthermore, FIGS. 1 and 2 show that in the region of the axis of rotation 8 in the side surface 2, a depression 12 is provided that in the exemplary embodiment depicted is configured as a non-ground surface region, and thus forms at least one unground surface region radially inside the ground surface. This depression 12 can serve, for example, to captively retain the roller 1 against or in a cage (not shown) during assembly. Alternatively or additionally, the depression 12 can also be as a ground region, and/or a non-ground surface region can be provided radially outside the ground surface, i.e., outside the ground profile 10, for example, in the transition region 14 to the rolling surface 6.

Figure 3:
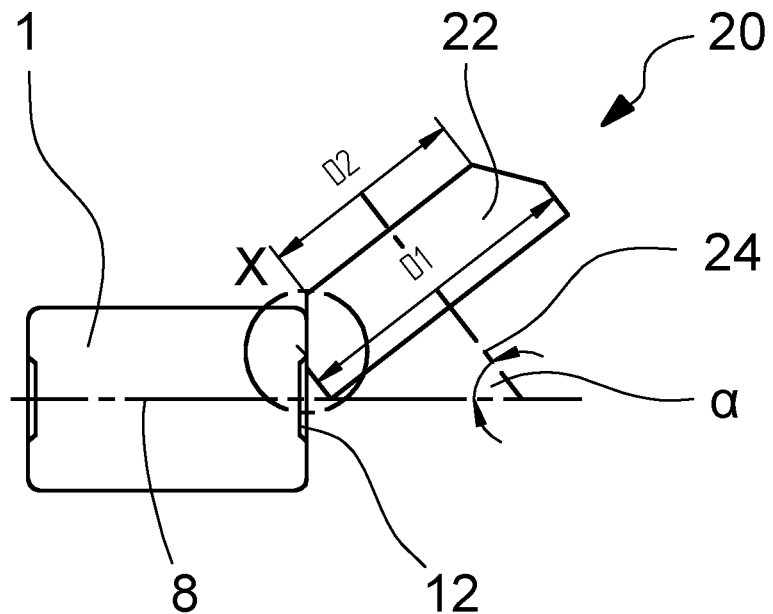
FIG. 3 is an assembly including a grinding tool and a roller for a roller bearing according to another embodiment of the present disclosure.
Figure 4:
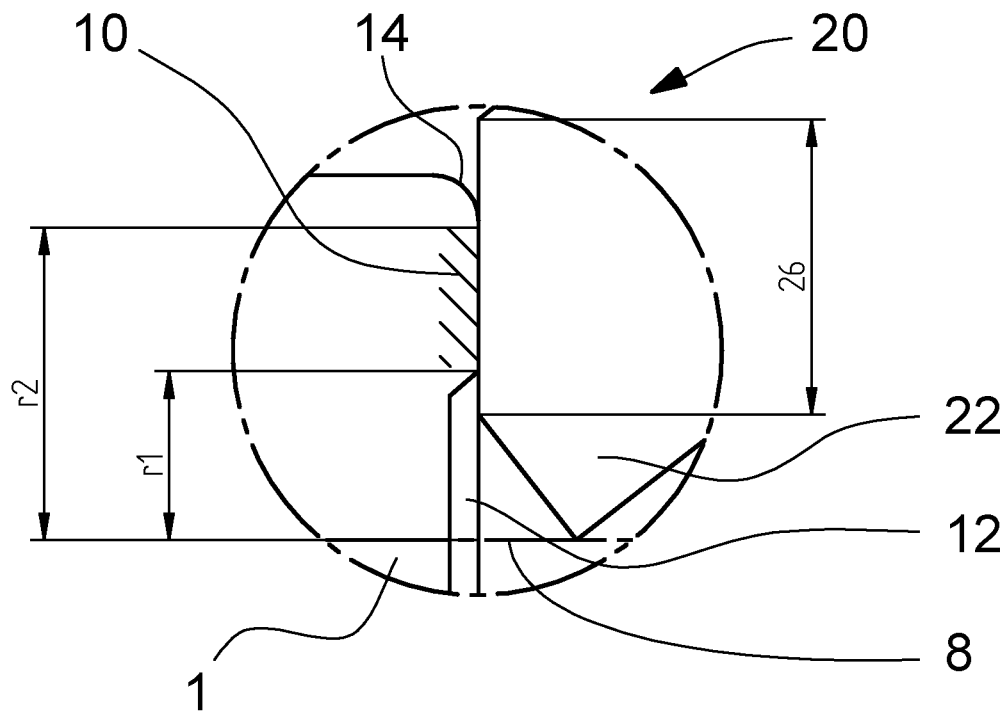
FIG. 4 is a detail view of section X of FIG. 3.

FIG. 3 shows an assembly 20 including a grinding tool 22 and a roller 1 for a roller bearing, wherein the roller 1 shown in FIG. 3 is configured as a cylindrical roller. FIG. 4 shows a section X of the assembly.

The grinding tool 22 has an axis of rotation 24, and the roller 1 has an axis of rotation 8, wherein the grinding tool 22 and the roller 1 are rotatable relative to each other about their respective axes of rotation 8, 24. Furthermore, the grinding tool 22 and the roller 1 can also be movable relative to each other. The rotational directions of the axes of rotation 8, 24 are preferably chosen such that a counter-movement is carried out in the contact region of grinding tool 22 and roller 1.

The axis of rotation 24 of the grinding tool 22 and the axis of rotation 8 of the roller 1 enclose an angle α that can assume a value between 0° and 90°, in particular between 25° and 75°. In addition, the angle α between the axis of rotation 24 of the grinding tool 22 and the axis of rotation 8 of the roller 1 can be adjustable depending on the roller to be ground.

In the exemplary embodiment depicted, the grinding tool 22 has the shape in cross-section of a truncated cone, and includes a grinding surface 26 that is formed on an outer surface of the truncated cone. The grinding surface 26 has a coating made of a nickel matrix including embedded grinding particles made of cubic boron nitride (also called CBN), wherein a grain size of the grinding particles falls in the range between 20 and 100 μm, and can preferably be 50±20 μm and most preferably 46±2 μm. Alternatively or additionally, grinding particles made of diamond can also be embedded in the grinding surface 26. Furthermore, the grinding tool 22 can include a base body (not depicted) on which the coating is formed. In particular, the base body can be formed from metal, for example, steel. The base body is preferably very stiff, and preferably has a Young's modulus of more than 100 GPa.

In order to form the ground profile 10, the grinding surface 26 is provided with a profile complementary to the profile to be formed. Here the grinding surface 26 on the truncated cone has a first larger diameter D1 and a second smaller diameter D2. Furthermore, the grinding tool 22 is disposed on the roller 1 such that the first diameter D1 contacts the roller 1 further radially inward in with a roller radius r1, and the second diameter D2 contacts the roller further radially outward with a roller radius r2 (see FIG. 4).

In order that the first larger diameter D1 contacts the roller further radially inward, i.e., at the roller radius r1, and the second smaller diameter D2 contacts the roller further radially outward, i.e., at the larger roller radius r2, with a counter-rotation of the roller 1 and of the grinding tool 22 with respect to each other, it can be made possible that the relative rotational speeds of the smaller roller radius r1 and of the larger grinding tool diameter D1, or of the larger roller radius r2 and of the smaller grinding-tool diameter D2, match, so that a difference, in particular along the contact region, becomes smaller, and the relative rotational speed can be minimized. This allows the heat development that arises during grinding to be minimized. Here the region wherein the grinding tool 22 and the roller 1 contact essentially corresponds to the grinding region. Here the design of the ground profile 10 is more accurate the smaller the surface of the contact region is.

In summary, a roller for a roller bearing is provided including a ground end-side profile that has lower friction with an axial load, and thereby has a higher axial load capacity. Here the grinding makes possible shorter processing times and thus a more efficient manufacturing of the end-surface profiling, in particular in comparison to other processing methods, such as, for example, hard turning. Furthermore, it is also possible to provide small rolling elements with an arbitrarily curved profile, whereby an improvement of the sliding friction, and thus an increase of the axial load capacity of the rolling elements, is ensured.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rollers for roller bearings, assemblies including a grinding tool and a roller for a roller bearing and methods for manufacturing a roller for a roller bearing.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Roller
2, 4 End surface
6 Running surface
8 Axis of rotation
10 Ground profile
12 Depression
14 Transition region
20 Assembly
22 Grinding tool
24 Axis of rotation
26 Grinding surface
D1, D2 Diameter
r1, r2 Roller radius Z Maximum profile height
Y Profile height
X Transition region start
C Transition region end

What is claimed is:

1. A roller for a roller bearing, the roller comprising:
a first end surface and a second end surface and a rolling surface between the first and second end surfaces,
wherein the first end surface has an at least partially ground profile having a non-constant curvature,
wherein the roller has a radius R, and
wherein at 0.9 R from an axis of rotation of the roller, the profile has an angle β with respect to the radial direction that is in the range of $0.15° \leq \beta \leq 2.0°$.

2. The roller according to claim 1,
wherein the at least partially ground profile is formed at a transition from the first end surface to the rolling surface, and
wherein the at least partially ground profile of the end surface merges via an unground edge reduction into a profile that is formed on the rolling surface of the roller.

3. The roller according to claim 1, wherein the curvature extends along the radial direction.

4. The roller according to claim 1, wherein the curvature is logarithmic.

5. The roller according to claim 1, wherein the curvature is toroidal.

6. The roller according to claim 1, wherein the roller includes at least one unground surface region radially inside the ground surface.

7. The roller according to claim 1,
wherein the roller has a radius R,
wherein a plane perpendicular to an axis of rotation of the roller intersects the first end surface at a location 0.65 R from the axis of rotation, and
wherein at 0.88 R from the axis of rotation, the first end surface is spaced from the plane by between 0.00007×R and 0.0020×R.

8. An assembly comprising:
a roller according to claim 1, and
a grinding tool having a grinding surface in contact with the first end surface
wherein the grinding tool and the roller are rotatable relative to each other.

9. The assembly according to claim 8,
wherein the grinding tool in cross section has a shape of a truncated cone, and furthermore includes a grinding surface that is formed on an outer surface of the truncated cone.

10. The assembly according to claim 9,
wherein the grinding surface has a coating made of a nickel matrix including embedded particles of cubic boron nitride, and/or diamond, and
wherein a grain size of the grinding particles falls in a range between 20 and 100 µm.

11. A method for manufacturing a roller according to claim 1 comprising:
providing a grinding tool, and
rotating the grinding tool and the roller relative to each other to form the ground profile.

12. A roller for a roller bearing, the roller comprising:
a first end surface and a second end surface and a rolling surface between the first and second end surfaces,
wherein the first end surface has an at least partially ground profile having a non-constant curvature,
wherein the roller has a radius R,
wherein a plane perpendicular to an axis of rotation of the roller intersects the first end surface at a location 0.65 R from the axis of rotation, and
wherein at 0.88 R from the axis of rotation, the first end surface is spaced from the plane by between 0.00007×R and 0.0020×R.

* * * * *